United States Patent [19]

Iwasaki

[11] Patent Number: 5,162,648
[45] Date of Patent: Nov. 10, 1992

[54] CONFOCAL SCANNING INTERFERENCE MICROSCOPE USING REFERENCE BEAM

[75] Inventor: Osamu Iwasaki, Kanagawa, Japan
[73] Assignee: Fuji Photo Film Co., Ltd., Kanagawa, Japan
[21] Appl. No.: 779,245
[22] Filed: Oct. 18, 1991

[30] Foreign Application Priority Data

Oct. 20, 1990 [JP] Japan ................... 2-282350

[51] Int. Cl.$^5$ ............................................. H01J 3/14
[52] U.S. Cl. .................................. 250/216; 356/352; 359/371
[58] Field of Search ............... 250/216, 225, 234, 235, 250/236, 227.11, 227.21; 356/359, 360, 351, 352; 359/370, 371

[56] References Cited

U.S. PATENT DOCUMENTS

| | | | |
|---|---|---|---|
| 4,627,730 | 12/1986 | Jungerman et al. | 356/359 |
| 5,048,964 | 9/1991 | Tyrer et al. | 356/360 |
| 5,065,008 | 11/1991 | Hakamata et al. | |
| 5,081,349 | 1/1992 | Iwasaki . | |
| 5,081,350 | 1/1992 | Iwasaki et al. | |
| 5,084,612 | 1/1992 | Iwasaki et al. | |

FOREIGN PATENT DOCUMENTS 62-217218 9/1987 Japan .

*Primary Examiner*—David C. Nelms
*Assistant Examiner*—K. Shami
*Attorney, Agent, or Firm*—Sughrue, Mion, Zinn, Macpeak & Seas

[57] ABSTRACT

A confocal scanning type of interference microscope comprises a sample supporting member on which a sample is supported, a light source which produces a light beam, and a light projecting optical system with which a small light spot of the light beam is formed on the sample. A light receiving optical system condenses the light beam radiated out of the sample and forms a point image, which is detected by a photodetector. Before the light beam impinges upon the sample, a beam splitting device splits it into a light beam, which is to be irradiated to the sample, and a reference light beam, which is not to be irradiated to the sample. A beam combining device combines the light beam radiated out of the sample and the reference light beam. A reference light beam optical system equivalent to the light projecting and receiving optical systems is located in the optical path of the reference light beam. An optical system supporting member supports the light projecting optical system, the light receiving optical system, and the reference light beam optical system. A scanning device moves the sample supporting member with respect to the optical system supporting member, whereby the sample is scanned two-dimensionally with the light spot.

12 Claims, 4 Drawing Sheets

CONFOCAL SCANNING INTERFERENCE MICROSCOPE USING REFERENCE BEAM

BACKGROUND OF THE INVENTION

1. Field of the Invention

This invention relates to a confocal scanning type of microscope. This invention particularly relates to a confocal scanning type of interference microscope for forming a visible image representing the phase information of a transparent sample.

2. Description of the Prior Art

Optical type scanning microscopes have heretofore been used. With the scanning microscope, a light beam is converged to a small light spot on a sample, and the sample is two-dimensionally scanned with the light spot. The light beam, which has passed through the sample during the scanning, the light beam, which has been reflected from the sample during the scanning, or the fluorescence, which is produced by the sample during the scanning, is detected by a photodetector. An enlarged image of the sample is thereby obtained.

As one type of the scanning microscopes, a confocal scanning microscope has heretofore been proposed. With the confocal scanning microscope, a light beam is produced by a light source and is condensed to a light spot such that an image of the light spot is formed on a sample. Also, a point image of the light beam, which has been radiated out of the sample, is formed and detected by a photodetector. The confocal scanning microscope is advantageous in that no pinhole plate need be located on the surface of the sample.

Basically, the confocal scanning microscope comprises:
 i) a light source which produces a light beam,
 ii) a sample supporting member on which a sample is supported,
 iii) a light projecting optical means with which an image of the light beam is formed as a small light spot on the sample,
 iv) a light receiving optical means with which the light beam radiated out of the sample (i.e. the light beam, which has passed through the sample, the light beam, which has been reflected from the sample, or the fluorescence produced by the sample) is condensed, and an image of the condensed light beam is formed as a point image,
 v) a photodetector which detects the point image, and
 vi) scanning mechanism for two-dimensionally scanning the sample with the light spot. An example of the confocal scanning microscope is disclosed in Japanese Unexamined Patent Publication No. 62(1987)-217218.

Also, an interference microscope has heretofore been proposed, with which the phase information of a transparent object (i.e. a phase object) can be investigated. Basically, with the interference microscope, before a light beam to be irradiated to a sample, which serves as a phase object, impinges upon the sample, the light beam is split into two light beams. Thereafter, the light beam, which has passed through the sample, and the light beam (i.e. the reference light beam), which has not passed through the sample, are combined with each other. An interference image is formed from the optical path difference between the light beam, which has passed through the sample, and the reference light beam, which has not passed through the sample.

Confocal scanning microscopes have the advantages in that, for example, three-dimensional image information can be obtained easily. If the confocal scanning microscopes can be constituted as interference microscopes, such confocal scanning types of interference microscopes will be very advantageous in the investigation of phase information of phase objects. However, heretofore, such a confocal scanning type of interference microscope has not been provided in practice. Specifically, when a light beam and a reference light beam are caused to scan, the lengths of their optical paths fluctuate easily. This is the reason why such a confocal scanning type of interference microscope has not been provided in practice.

SUMMARY OF THE INVENTION

The primary object of the present invention is to provide a confocal scanning type of interference microscope which can be satisfactorily used in practice.

Another object of the present invention is to provide a confocal scanning type of interference microscope which forms a visible image accurately representing the phase information of a transparent sample.

The present invention provides a confocal scanning type of interference microscope comprising:
 i) a sample supporting member on which a sample is supported,
 ii) a light source which produces a light beam,
 iii) a light projecting optical means with which an image of said light beam is formed as a small light spot on said sample,
 iv) a light receiving optical means with which the light beam radiated out of said sample is condensed, and an image of the condensed light beam is formed as a point image,
 v) a photodetector which detects said point image,
 vi) a beam splitting means for splitting said light beam, which has been produced by said light source, into a light beam, which is to be irradiated to said sample, and a reference light beam, which is not to be irradiated to said sample, before said light beam having been produced by said light source impinges upon said sample,
 vii) a beam combining means for combining said light beam, which has been radiated out of said sample, and said reference light beam with each other,
 viii) a reference light beam optical means which is constituted equivalently to said light projecting optical means and said light receiving optical means and which is located in the optical path of said reference light beam,
 ix) an optical means supporting member which supports said light projecting optical means, said light receiving optical means, and said reference light beam optical means together, and
 x) a scanning means which moves said sample supporting member with respect to said optical means supporting whereby said sample is scanned two-dimensionally with said light spot.

As will be understood from the specification, it should be noted that the term "moving a sample supporting member with respect to an optical means supporting member" as used herein means movement of the sample supporting member relative to the optical means supporting member, and embraces both the cases wherein the sample supporting member is moved while the optical means supporting member is kept stationary, and cases wherein the optical means supporting member is moved while the sample supporting member is kept stationary.

With the confocal scanning type of interference microscope in accordance with the present invention, the light beam, which is irradiated to the sample, and the reference light beam are not deflected during the scanning. Therefore, the lengths of the optical paths of the light beam, which is irradiated to the sample, and the reference light beam do not fluctuate. Also, only the light beams on the optical axes of the light projecting optical means, the light receiving optical means, and the reference light beam optical means need be taken into consideration during the designing of the optical means. Accordingly, the light projecting optical means, the light receiving optical means, and the reference light beam optical means can be designed easily.

With the confocal scanning type of interference microscope in accordance with the present invention, the light projecting optical means, the light receiving optical means, and the reference light beam optical means are supported together by the optical means supporting member. The scanning with the light spot is carried out by moving the sample supporting member with respect to the optical means supporting member. Therefore, the problems can be prevented from occurring in that the lengths of the optical paths of the light beam, which is irradiated to the sample, and the reference light beam are caused to fluctuate by the scanning of the light spot. Accordingly, with the confocal scanning type of interference microscope in accordance with the present invention, a visible image can be obtained which accurately represents the phase information of a transparent sample.

DESCRIPTION OF THE PREFERRED EMBODIMENTS

The present invention will hereinbelow be described in further detail with reference to the accompanying drawings.

Figure 1:
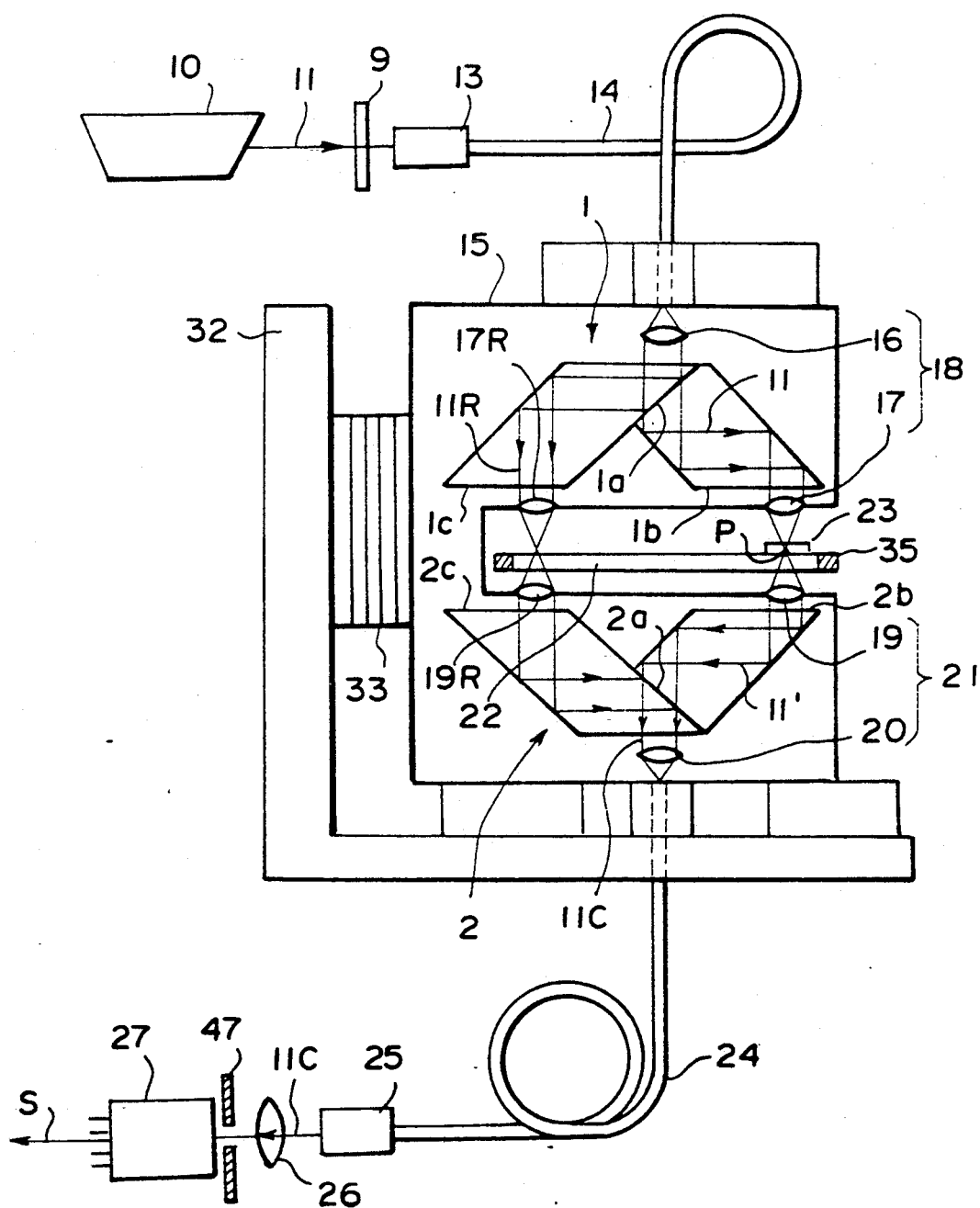
FIG. 1 is a schematic front view showing an embodiment of the confocal scanning type of interference microscope in accordance with the present invention.
Figure 2:
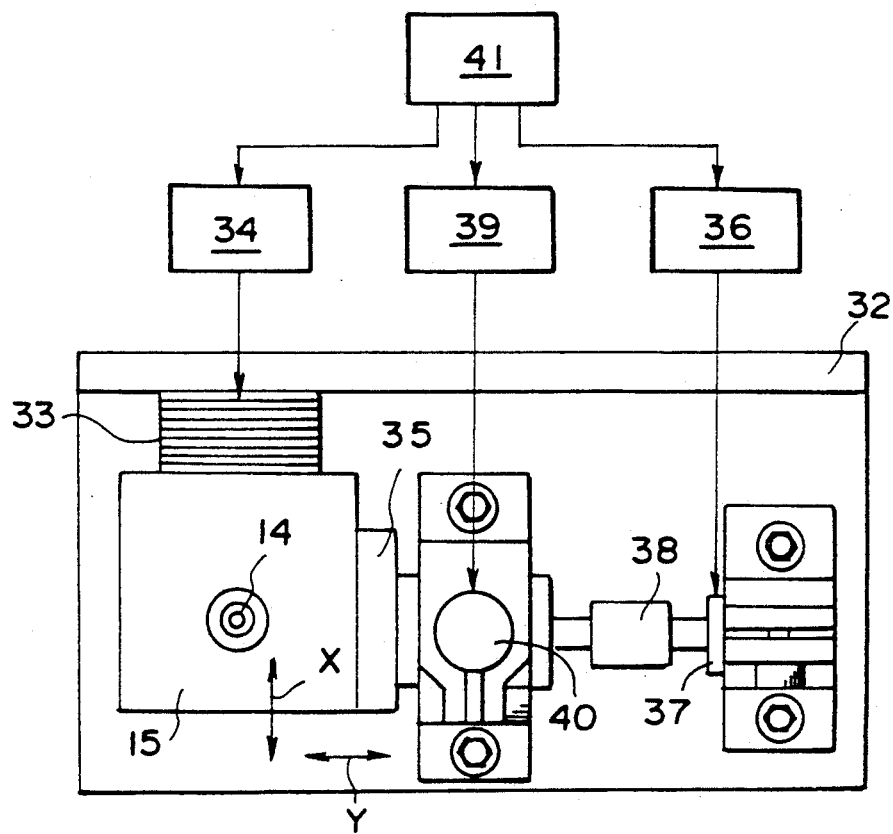
FIGS. 2 and 3 are a plan view and a side view showing the major part of the embodiment shown in FIG. 1.
Figure 3:
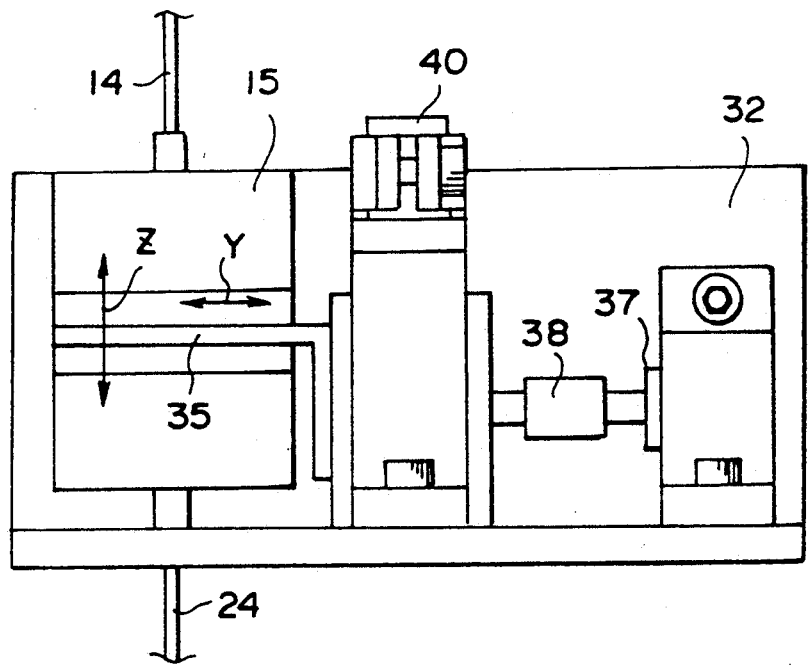

FIG. 1 shows an embodiment of the confocal scanning type of interference microscope in accordance with the present invention. This embodiment is of the transmission type. FIGS. 2 and 3 show a scanning mechanism employed in this embodiment.

With reference to FIG. 1, a monochromatic light laser 10 produces a laser beam 11, which has been polarized linearly and serves as a light beam to be irradiated to a sample. The laser beam 11 passes through a halfwave plate 9 for adjusting the plane of polarization. The laser beam 11, which has passed through the halfwave plate 9, is condensed by a distributed index lens 13 and impinges upon a polarization plane keeping optical fiber 14.

Figure 4:
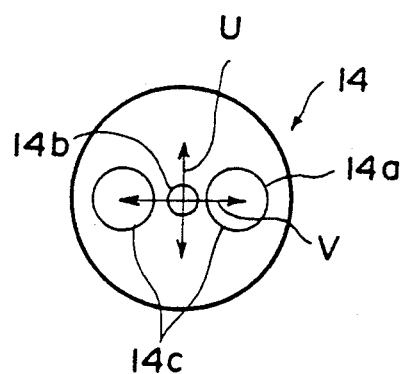
FIG. 4 is a sectional view showing a polarization plane keeping optical fiber employed in the embodiment of FIG. 1.

As the polarization plane keeping optical fiber 14, a PANDA type optical fiber may be employed. FIG. 4 shows the cross-sectional configuration of the PANDA type optical fiber 14. As illustrated in FIG. 4, the optical fiber 14 is composed of a cladding part 14a and a core 14b which is located in the cladding part 14a. Stress imparting parts 14c, 14c are formed on both sides of the core 14b. The halfwave plate 9 is rotated appropriately such that the orientation of the plane of polarization of the linearly polarized laser beam 11 coincides with the directions indicated by the double headed arrow V in FIG. 4, along which the stress imparting parts 14c, 14c stand in a line, or the directions indicated by the double headed arrow U in FIG. 4, which directions are normal to the directions indicated by the double headed arrow V. In this manner, the linearly polarized laser beam 11 is caused to impinge upon the optical fiber 14.

One edge of the optical fiber 14 is secured to a movable member 15. The laser beam 11, which has been guided through the optical fiber 14, is radiated out of the edge of the optical fiber 14, which is secured to the movable member 15. At this time, the edge of the optical fiber 14 radiates the laser beam 11 like a point light source. A light projecting optical means 18 and a light receiving optical means 21 are secured to the movable member 15. The light projecting optical means 18 is composed of a collimator lens 16 and an objective lens 17. The light receiving optical means 21 is composed of an objective lens 19 and a condensing lens 20. The objective lenses 17 and 19 are secured such that their optical axes align with each other. Also, a sample supporting member 22, which is independent of the movable member 15, is located between the light projecting optical means 18 and the light receiving optical means 21.

A first beam splitter 1 is secured to the movable member 15. The first beam splitter 1 separates part of the laser beam 11, which has been collimated by the collimator lens 16, as a reference laser beam 11R from the laser beam 11. As illustrated, the first beam splitter 1 is composed of two optical blocks, which have an equal height and are joined with each other.

The laser beam 11 impinges as P-polarized light or as S-polarized light upon a plane of junction 1a of the optical blocks. Part of the laser beam 11 is reflected from the plane of junction 1a, and the reference laser beam 11R is thereby separated from the laser beam 11. The remainder of the laser beam 11 passes through the plane of junction 1a.

The laser beam 11, which has passed through the plane of junction 1a, is totally reflected twice from the interface between the first beam splitter 1 and ambient air. Thereafter, the laser beam 11 impinges upon the objective lens 17. The reference laser beam 11R, which has been reflected from the plane of junction 1a, is totally reflected once from the interface between the first beam splitter 1 and ambient air. Thereafter, the reference laser beam 11R is radiated out of the first beam splitter 1 along the direction parallel to the direction along which the laser beam 11 is radiated out of the first beam splitter 1.

Also, reference light beam lenses 17R and 19R, which are equivalent respectively to the objective lenses 17 and 19, are secured to the movable member 15 such that the optical axes of the reference light beam lenses 17R and 19R align with each other. The reference light beam lens 17R is located such that its optical axis is parallel to the optical axis of the objective lens 17. The position of the reference light beam lens 17R with respect to its optical axis direction coincides with the position of the objective lens 17 with respect to its optical axis direction. Also, the reference light beam lens 19R is located such that its optical axis is parallel to the optical axis of the objective lens 19. The position of the reference light beam lens 19R with respect to its optical axis direction coincides with the position of the objective lens 19 with respect to its optical axis direction. Additionally, a second beam splitter 2, which has the same shape as the first beam splitter 1, is secured to the movable member 15.

The laser beam 11 is collimated by the collimator lens 16, and the collimated laser beam 11 then passes through the first beam splitter 1 in the manner described above. The laser beam 11 is then condensed by the objective lens 17. In this manner, an image of the condensed laser beam 11 is formed as a small light spot P on a transparent sample 23 (i.e. on the surface of the transparent sample 23 or in the inside of the transparent sample 23), which is placed on the sample supporting member 22. A laser beam 11′, which has passed through the sample 23, is collimated by the objective lens 19 of the light receiving optical means 21, and the collimated laser beam 11′ impinges upon the second beam splitter 2. In the second beam splitter 2, the laser beam 11′ is totally reflected twice. Thereafter, the laser beam 11′ passes through a plane of junction 2a, which is the same as the plane of junction 1a, and is radiated out of the second beam splitter 2.

The reference laser beam 11R, which has been radiated out of the first beam splitter 1, is condensed and collimated by the lenses 17R and 19R in the same manner as the laser beam 11′. Thereafter, the reference laser beam 11R impinges upon the second beam splitter 2. In the second beam splitter 2, the reference laser beam 11R is totally reflected once. The reference laser beam 11R is then reflected by the plane of junction 2a and is combined with the laser beam 11′, which has passed through the plane of junction 2a, into a combined laser beam 11C.

The combined laser beam 11C is radiated out of the second beam splitter 2 and is then condensed by the condensing lens 20. Thereafter, the combined laser beam 11C enters a polarization plane keeping optical fiber 24 from its one edge. The edge of the optical fiber 24 is secured to the movable member 15, and the other edge thereof is connected to a distributed index lens 25. The combined laser beam 11C, which has been guided through the optical fiber 24, is radiated out of the other edge of the optical fiber 24 and is collimated by the distributed index lens 25.

Thereafter, the combined laser beam 11C is converged by a converging lens 26 and passes through a pinhole of a pinhole plate 47 for blocking stray light and external light. The combined laser beam 11C is then detected by a photodetector 27, which may be constituted of a photomultiplier, or the like. The first beam splitter 1 has such a shape that its two light radiating surfaces 1b and 1c are flush with each other, and the lengths of the optical paths from the point, at which the laser beam 11 is split, to the light radiating surfaces 1b and 1c are equal to each other. Also, the second beam splitter 2 has such a shape that its two light entry surfaces 2b and 2c are flush with each other, and the lengths of the optical paths from the light entry surfaces 2b and 2c to the point, at which the reference laser beam 11R and the laser beam 11′ are combined with each other, are equal to each other.

With this embodiment, the phase of the laser beam 11 changes when it passes through the transparent sample 23. Therefore, when the laser beam 11′, which has passed through the sample 23, and the reference laser beam 11R, which has not passed through the sample 23, are combined with each other, an interference image is thereby formed in accordance with the phase information of the sample 23. Accordingly, the photodetector 27 detects the phase information of the sample 23 as a change in the amount of the combined laser beam 11C and generates a signal S, which represents the phase information.

How the sample 23 is two-dimensionally scanned with the light spot P of the laser beam 11 will be described hereinbelow with reference to FIGS. 2 and 3. FIG. 2 is a plan view showing the movable member 15 and the surrounding parts shown in FIG. 1. FIG. 3 is a right side view showing the movable member 15 and the surrounding parts shown in FIG. 1.

With reference to FIGS. 2 and 3, the movable member 15 is secured to a laminated piezo-electric device 33, which is in turn secured to a frame 32. The laminated piezo-electric device 33 receives operating electric power from a piezo-electric device operating circuit 34 and reciprocally moves the movable member 15 at high speeds in the main scanning directions indicated by the double headed arrow X. By way of example, the frequency of the reciprocal movement is set as being 10 kHz. In such cases, if the main scanning width is equal to 100 μm, the main scanning speed will be equal to $$10 \times 10^3 \times 100 \times 10^{-6} \times 2 = 2 \ m/s$$

The optical fibers 14 and 24 are flexible and allow the movable member 15 to move while the laser beam 11 is being guided through the optical fiber 14 and the combined laser beam 11C is being guided through the optical fiber 24.

The sample supporting member 22 is secured to a two-dimensionally movable stage 35. The two-dimensionally movable stage 35 is connected to a micrometer 38, which is in turn connected to a pulse motor 37. The pulse motor 37 receives an operating current from a motor operating circuit 36. The two-dimensionally movable stage 35 is reciprocally moved by the pulse motor 37 in the sub-scanning directions indicated by the double headed arrow Y. In this manner, the sample supporting member 22 is moved with respect to the movable member 15, and the sample 23 is scanned with the light spot P in the sub-scanning directions indicated by the double headed arrow Y. The sub-scanning directions are normal to the main scanning directions indicated by the double headed arrow X. By way of example, the time required for the sub-scanning is set as being 1/20 second. In such cases, if the sub-scanning width is equal to 100 μm, the sub-scanning speed will be $$20 \times 100 \times 10^{-6} = 0.002 \ m/s = 2 \ mm/s$$

Specifically, the sub-scanning speed is sufficiently lower than the main scanning speed. When the sub-scanning speed is as low as this level, the sample 23 does not fly out of its correct position when the sample supporting member 22 is moved.

In the manner described above, the sample 23 is two-dimensionally scanned with the light spot P. As a result, the serial signal S representing the two-dimensional interference image of the sample 23 is obtained. By way of example, the signal S is sampled with a predetermined period, and a signal divided into picture elements is thereby obtained.

In this embodiment, the two-dimensionally movable stage 35 is also moved by a pulse motor 40 in the directions indicated by the double headed arrow Z (i.e. along the optical axis of the light projecting optical means 18 and the light receiving optical means 21), which directions are normal to the main scanning directions indicated by the double headed arrow X and the sub-scanning directions indicated by the double headed arrow Y. For this purpose, a motor operating circuit 39 feeds an operating current to the pulse motor 40. The two-dimensional scanning with the light spot P is carried out each time the two-dimensionally movable stage 35 is moved a predetermined distance along the directions indicated by the double headed arrow Z. In this manner, a signal can be obtained which represents three-dimensional phase information.

A control circuit 41 feeds synchronizing signals to the piezo-electric device operating circuit 34 and the motor operating circuits 36, 39. The synchronizing signals synchronize the scanning with the light spot P in the main and sub-scanning directions, and the movement of the sample supporting member 22 in the directions indicated by the double headed arrow Z with each other.

In this embodiment, the polarization plane keeping optical fibers 14 and 24 are employed as the optical fiber, through which the laser beam 11 is guided, and the optical fiber, through which the combined laser beam 11C is guided. Therefore, the sway in the laser beam 11 and the combined laser beam 11C can be restricted. Accordingly, when the interference image is reproduced from the signal S, which has been obtained by detecting the combined laser beam 11C, an interference image can be obtained which is free of any distortion.

The embodiment described above may be modified in various ways. For example, microscope objective lenses, or the like, may be employed in lieu of the distributed index lenses 13 and 25. Also, a d.c. motor provided with an encoder may be employed in lieu of the pulse motor 37, which reciprocally moves the sample supporting member 22 secured to the two-dimensionally movable stage 35 in the sub-scanning directions indicated by the double headed arrow Y. Instead of the sub-scanning with the light spot P being carried out by the movement of the sample supporting member 22, the sub-scanning with the light spot P may be effected by moving the movable member 15. Additionally, instead of the laminated piezo-electric device 33 being used to move the movable member 15, a scanning technique utilizing a voice coil, a tuning fork, natural oscillation of a solid with ultrasonic waves, or the like, may be utilized to move the movable member 15.

Figure 5:
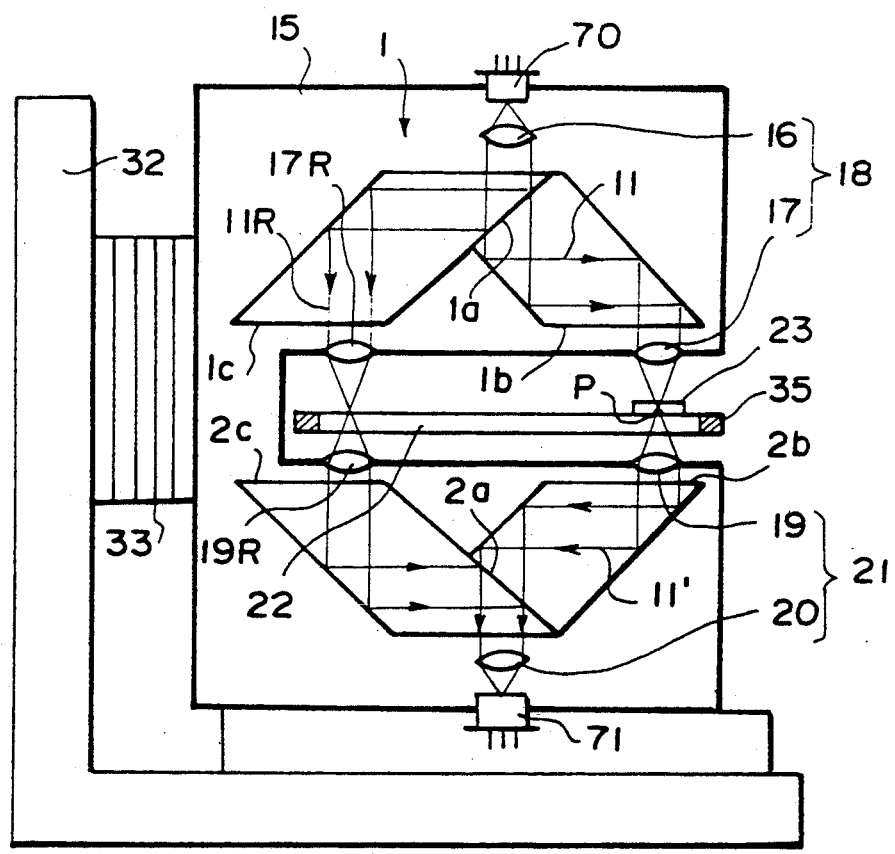
FIG. 5 is a schematic front view showing a different embodiment of the confocal scanning type of interference microscope in accordance with the present invention.

A different embodiment of the confocal scanning type of interference microscope in accordance with the present invention will be described hereinbelow with reference to FIG. 5. In FIG. 5, similar elements are numbered with the same reference numerals with respect to FIG. 1.

In the embodiment of FIG. 5, a laser diode 70, which produces a monochromatic laser beam, is employed as the light source for producing the laser beam 11. Also, a small photodetector 71 is employed which may be constituted of a photodiode, or the like. The photodetector 71 and the laser diode 70 are secured to the movable member 15. Therefore, this embodiment can be kept smaller than the embodiment of FIG. 1.

Figure 6:
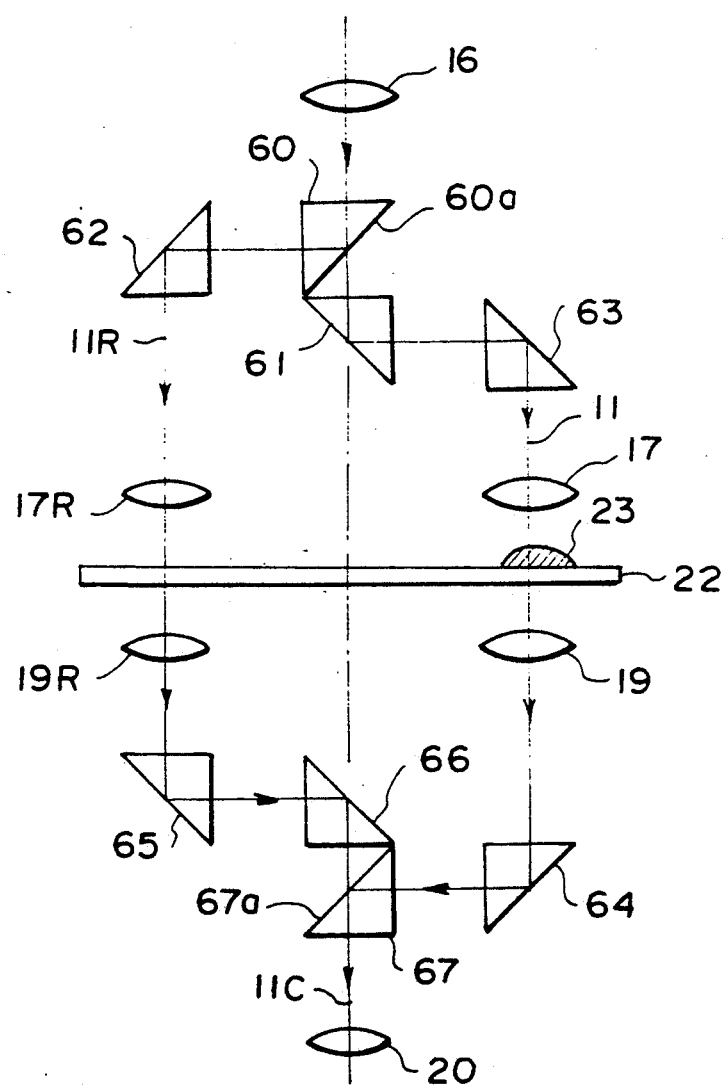
FIG. 6 is a front view showing different examples of a beam splitting means and a beam combining means employed in the confocal scanning type of interference microscope in accordance with the present invention.

FIG. 6 is a front view showing different examples of a beam splitting means and a beam combining means employed in the confocal scanning type of interference microscope in accordance with the present invention.

With reference to FIG. 6, the beam splitting means is constituted of four rectangular prisms 60, 61, 62, and 63. The beam combining means is constituted of four rectangular prisms 64, 65, 66, and 67. A surface 60a of the rectangular prism 60 is constituted as a semitransparent surface, which reflects 50% of the laser beam 11. The light reflecting surfaces of the other prisms 61 through 67 are total reflection surfaces. A surface 67a of the rectangular prism 67 is provided with a coating film, which prevents the reference laser beam 11R from being reflected by the surface 67a and minimizes the passage of the laser beam 11 through the surface 67a.

With the beam splitting means and the beam combining means shown in FIG. 6, the lengths of the optical paths of the laser beam 11 (and the laser beam 11') and the reference laser beam 11R from the point, at which the laser beam 11 is split, to the point, at which the laser beam 11' and the reference laser beam 11R are combined with each other, can be kept equal to each other. Also, in cases where the surfaces of the rectangular prisms 60 through 67 are provided with appropriate coating films, the reference laser beam 11R and the laser beam 11 (or the laser beam 11') are not unnecessarily reflected by these surfaces or do not unnecessarily pass through these surfaces. Therefore, the reference laser beam 11R and the laser beam 11' can be combined with each other in a ratio of light amount of approximately 1:1. In such cases, the visibility of the interference fringes can be kept good in the sample image.

The aforesaid embodiments are constituted as monochromatic types. However, the confocal scanning type of interference microscope in accordance with the present invention can also be constituted such that a color image can be formed.

What is claimed is:

1. A confocal scanning type of interference microscope comprising:
   i) a sample supporting member on which a sample is supported,
   ii) a light source which produces a light beam,
   iii) a light projecting optical means with which an image of said light beam is formed as a small light spot on said sample,
   iv) a light receiving optical means with which the light beam radiated out of said sample is condensed, and an image of the condensed light beam is formed as a point image,
   v) a photodetector which detects said point image,
   vi) a beam splitting means for splitting said light beam, which has been produced by said light source, into a light beam, which is to be irradiated to said sample, and a reference light beam, which is not to be irradiated to said sample, before said light beam having been produced by said light source impinges upon said sample,
   vii) a beam combining means for combining said light beam, which has been radiated out of said sample, and said reference light beam with each other, viii) a reference light beam optical means which is constituted equivalently to said light projecting optical means and said light receiving optical means and which is located in the optical path of said reference light beam, ix) an optical means supporting member which supports said light projecting optical means, said light receiving optical means, and said reference light beam optical means together, and x) a scanning means which moves said sample supporting member with respect to said optical means supporting member, whereby said sample is scanned two-dimensionally with said light spot.

2. A confocal scanning type of interference microscope as defined in claim 1 wherein said beam splitting means is composed of two optical blocks, which have an equal height and are joined with each other.

3. A confocal scanning type of interference microscope as defined in claim 1 wherein said beam combining means is composed of two optical blocks, which have an equal height and are joined with each other.

4. A confocal scanning type of interference microscope as defined in claim 1 wherein said beam splitting means is composed of a plurality of rectangular prisms.

5. A confocal scanning type of interference microscope as defined in claim 1 wherein said beam combining means is composed of a plurality of rectangular prisms.

6. A confocal scanning type of interference microscope as defined in claim 1 wherein said optical means supporting member also supports said light source.

7. A confocal scanning type of interference microscope as defined in claim 1 or 6 wherein said optical means supporting member also supports said photodetector.

8. A confocal scanning type of interference microscope as defined in claim 1 wherein said light beam, which has been produced by said light source, is guided through a polarization plane keeping optical fiber and is then irradiated from an edge of said polarization plane keeping optical fiber to said light projecting optical means.

9. A confocal scanning type of interference microscope as defined in claim 1 wherein the combined light beam, which has been obtained from the beam combining means, is guided through a polarization plane keeping optical fiber to said photodetector.

10. A confocal scanning type of interference microscope as defined in claim 1 wherein said scanning means comprises:

a) a main scanning means which reciprocally moves said optical means supporting member such that said light spot scans said sample in main scanning directions, and b) a sub-scanning means which moves said sample supporting member with respect to said optical means supporting member in sub-scanning directions, which are approximately normal to said main scanning directions, and at a speed lower than the speed at which said light spot scans said sample in said main scanning directions, whereby said sample is scanned with said light spot in said sub-scanning directions.

11. A confocal scanning type of interference microscope as defined in claim 10 wherein a means is provided which reciprocally moves said sample supporting member in directions, which are normal to said main scanning directions and said sub-scanning directions.

12. A confocal scanning type of interference microscope as defined in claim 1 wherein said light source is a laser.

* * * * *